Nov. 11, 1947.  F. E. ALTMAN  2,430,549
OPTICAL SIGHTING LENS SYSTEM
Filed Nov. 20, 1943  3 Sheets-Sheet 1
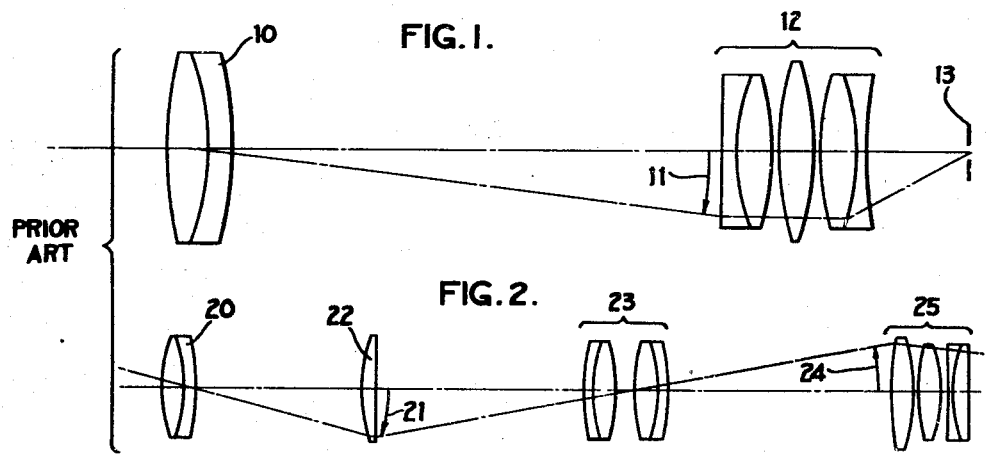
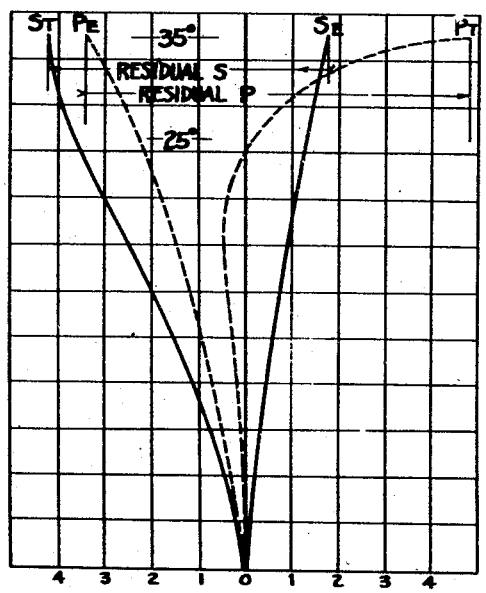
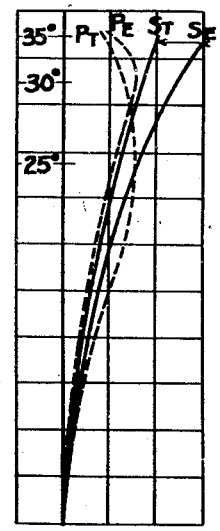
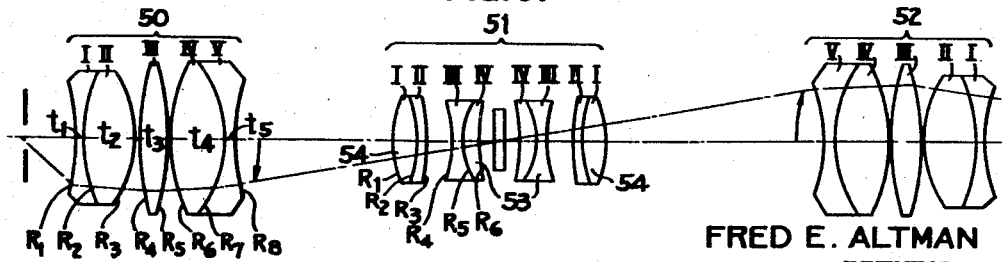
FRED E. ALTMAN
*INVENTOR*
BY
ATTY & AGT Nov. 11, 1947.     F. E. ALTMAN     2,430,549
OPTICAL SIGHTING LENS SYSTEM
Filed Nov. 20, 1943     3 Sheets-Sheet 2

FIG. 12.

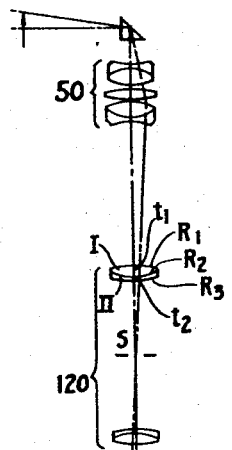

FIG. 6.

| OBJECTIVE ASSEMBLY | | | EF = 35.4 mm. | Ptz = +.017 |
|---|---|---|---|---|
| LENS | $N_D$ | V | RADII | THICKNESSES |
| I | 1.673 | 32.2 | $R_1 = -545.3$ | $t_1 = 3.90$ |
| II | 1.611 | 57.2 | $R_2 = +54.9$ | $t_2 = 21.40$ |
|  |  |  | $R_3 = -40.8$ | $S_1 = 0.24$ |
| III | 1.620 | 60.3 | $R_4 = +115.8$ | $t_3 = 10.02$ |
|  |  |  | $R_5 = -115.8$ | $S_2 = 0.24$ |
| IV | 1.611 | 57.2 | $R_6 = +62.4$ | $t_4 = 22.80$ |
| V | 1.649 | 33.8 | $R_7 = -46.0$ | $t_5 = 3.28$ |
|  |  |  | $R_8 = +64.5$ | BF = 13.7 |

FIG. 7.

| HALF OF ERECTOR ASSEMBLY | | | EF = 82.0 mm | Ptz = -.0032 |
|---|---|---|---|---|
| LENS | $N_D$ | V | RADII | THICKNESSES |
| I | 1.744 | 45.8 | $R_1 = +27.0$ | $t_1 = 6.0$ |
| II | 1.720 | 29.3 | $R_2 = -34.5$ | $t_2 = 2.0$ |
|  |  |  | $R_3 = -96.7$ | $S_1 = 7.5$ |
| III | 1.617 | 36.6 | $R_4 = -24.0$ | $t_3 = 2.5$ |
| IV | 1.620 | 60.3 | $R_5 = +24.0$ | $t_4 = 3.2$ |
|  |  |  | $R_6 = +49.6$ | $\frac{1}{2}S_2 = 5.1$ |

FIG. 13.

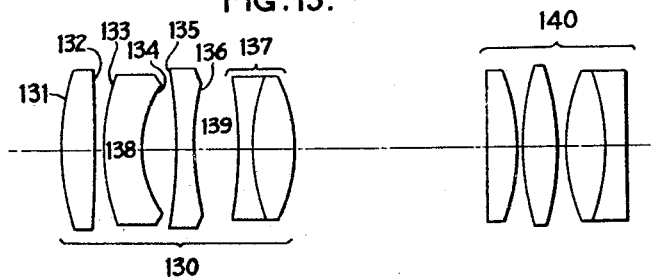

FIG. 14.

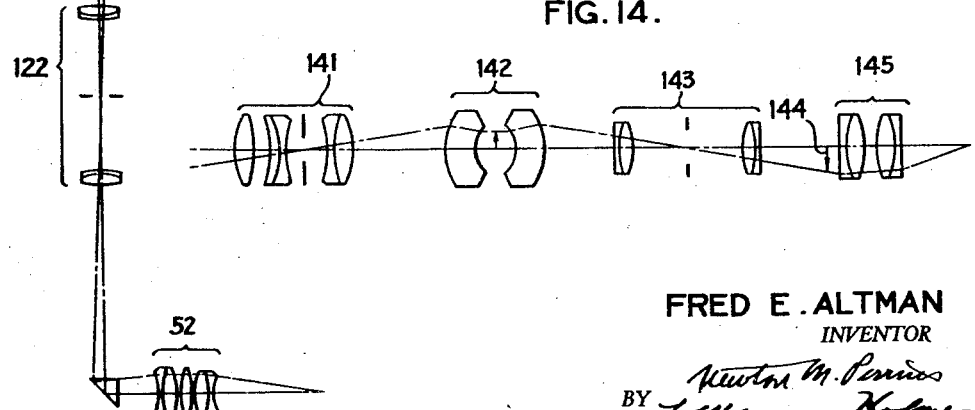

FRED E. ALTMAN
INVENTOR

BY  Newton M. Perrins
    F M Emerson Holmes
    ATTY & AGT

Nov. 11, 1947.  F. E. ALTMAN  2,430,549
OPTICAL SIGHTING LENS SYSTEM
Filed Nov. 20, 1943    3 Sheets-Sheet 3

FIG. 8.

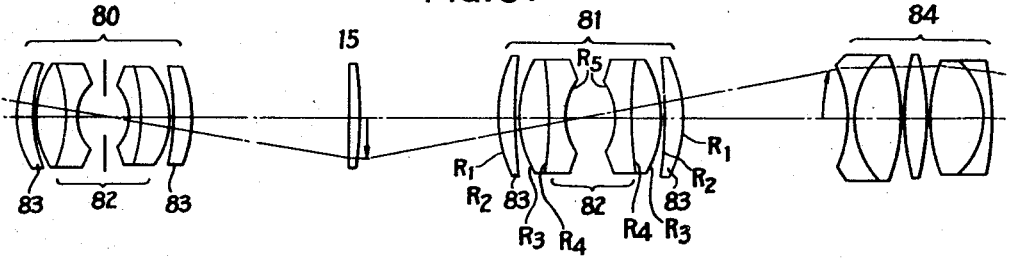

FIG. 9.

| OBJECTIVE ASSEMBLY | | | EF = 106 mm. | Ptz = –0.011 |
|---|---|---|---|---|
| LENS | $N_D$ | V | RADII | THICKNESSES |
| I | 1.745 | 46.4 | $R_1 = +28.0$ | $t_1 = 5.74$ |
|   |       |      | $R_2 = +50.9$ | $S_1 = 0.64$ |
| II | 1.611 | 57.2 | $R_3 = +23.0$ | $t_2 = 8.52$ |
| III | 1.617 | 36.6 | $R_4 = -39.8$ | $t_3 = 3.88$ |
|   |       |      | $R_5 = +13.3$ | $S_2 = 16.57$ |
| IV | 1.617 | 36.6 | $R_6 = -13.3$ | $t_4 = 3.88$ |
| V | 1.611 | 57.2 | $R_7 = -58.3$ | $t_5 = 8.52$ |
|   |       |      | $R_8 = -23.0$ | $S_3 = 0.64$ |
| VI | 1.745 | 46.4 | $R_9 = -113.0$ | $t_6 = 5.74$ |
|   |       |      | $R_{10} = -38.4$ | BF = 62.0 |

FIG. 10.

| ERECTOR ASSEMBLY | | | EF = 118 mm. | Ptz = –.002 |
|---|---|---|---|---|
| LENS | $N_D$ | V | RADII | THICKNESSES |
| I | 1.617 | 55.0 | $R_1 = +49.4$ | $t_1 = 7.07$ |
|   |       |      | $R_2 = +343.0$ | $S_1 = 0.78$ |
| II | 1.617 | 55.0 | $R_3 = +42.5$ | $t_2 = 11.56$ |
| III | 1.605 | 38.0 | $R_4 = -134.3$ | $t_3 = 6.11$ |
|   |       |      | $R_5 = +23.3$ | $\tfrac{1}{2}S_2 = 10.0$ |
| IV V VI | | SYMMETRICAL | | |

FIG. 11.

| EYEPIECE ASSEMBLY | | | EF = 38 mm. | Ptz = +.013 |
|---|---|---|---|---|
| LENS | $N_D$ | V | RADII | THICKNESSES |
| I | 1.720 | 29.3 | $R_1 = -59.9$ | $t_1 = 4.5$ |
| II | 1.697 | 56.1 | $R_2 = +40.0$ | $t_2 = 24.0$ |
|   |       |      | $R_3 = -71.2$ | $S_1 = 0.24$ |
| III | 1.620 | 60.3 | $R_4 = +115.8$ | $t_3 = 10.5$ |
|   |       |      | $R_5 = -115.8$ | $S_2 = 0.24$ |
| IV | 1.697 | 56.1 | $R_6 = +80.0$ | $t_4 = 22.5$ |
| V | 1.720 | 29.3 | $R_7 = -36.0$ | $t_5 = 4.0$ |
|   |       |      | $R_8 = -124.8$ | |

FRED E. ALTMAN
*INVENTOR*

BY
*ATTY & AG'T*

Patented Nov. 11, 1947

2,430,549

UNITED STATES PATENT OFFICE 2,430,549

OPTICAL SIGHTING LENS SYSTEM

Fred E. Altman, Rochester, N. Y., assignor to Eastman Kodak Company, Rochester, N. Y., a corporation of New Jersey Application November 20, 1943, Serial No. 511,062

19 Claims. (Cl. 88—57)

This invention relates to optical sighting devices such as telescopes and periscopes. An optical sighting device, at least as the term is commonly used and as it is used in this specification, consists primarily of an optical system which forms an image of the object being sighted and an eyepiece through which this image is viewed. The image-forming system may be a single objective, simple or complex, or may include one or more relay lenses, erector lenses, erector prisms, or positive field lenses. Sighting devices are also commonly provided with cross hairs or other form of reticle, placed so as to coincide with the image, or if more than one image is formed, with one of the images of the object or target being sighted.

The primary requirements of a sighting device, particularly one intended to cover a wide field of view, are that it shall give to the final image as it appears to the observer: (1) Excellent central definition; (2) a flat field; (3) freedom from astigmatism; (4) freedom from coma, all within close tolerance limits. From one point of view these attributes may be considered with respect to the final image of the telescope system assumed to be at infinity. Or from another point of view, the actual image formed in the eyepiece field is considered to be modified by the eyepiece and when so modified (but not necessarily before) must have these four attributes.

It is the object of the present invention to provide a sighting device meeting these requirements.

It is also desirable to have the lateral color and the rim-ray agreement highly corrected in sighting devices. The present application is drawn to an invention not concerned with such features, but they are discussed in my concurrently filed applications referred to below.

Prior attempts to provide flat field telescopes with wide covering power may in general be segregated into two distinct types. The first and most direct method involves an eyepiece design which introduces astigmatism, often in intolerable amounts, in an effort to give an average field, or perhaps a tangential field, which matches the corresponding field of the objective. Astigmatism is a measure of the separation of the sagittal and tangential fields. Such field matching is discussed by Berek on page 120 of his book, "Grundlagen der Praktischen Optik." A second prior method is described by A. E. Conrady in an article, "Anastigmatic Eyepieces," appearing in Monthly Notices of Royal Astronomical Society, April, 1918, page 445; also by H. D. Taylor in Transactions of the Optical Society (England), volume 22, 1920, page 63, and in German Patent 385,465, Taylor et al. This second method requires an abnormally large eyepiece and a strong, hence awkward, negative lens near the eyepiece field. The negative lens near the focal plane makes the image forming system a telephoto one with all the inherent disadvantages of such systems and with its principal planes in front of the front of the front lens. The present invention does not employ telephoto lenses and hence by definition, the image forming system has its principal planes between its vertices (i. e. between the points where the optic axis meets the front and rear surfaces of the image forming system). Even with the large eyepiece and strong negative lens the second prior method just described does not provide the degree of correction attempted by the present invention, and particularly is quite unequal to the task of correcting systems employing erector or relay lenses. The present invention, on the other hand, is particularly useful in correcting the aberrations in such more complex optical systems. The possibility of combining the present invention with the second prior method just mentioned obviously suggests itself, but at least at present such a refinement appears unnecessary for most sighting devices; it would in any case give only inappreciable improvement over the present invention alone.

Fundamentally, the present invention consists of an optical system having a negative Petzval sum and overcorrected curvature of field for forming an image of the object being sighted, and an eyepiece for viewing the image having a positive Petzval sum and undercorrected curvature of field substantially matching that of the image-forming system. As stated by Conrady supra, all eyepieces have a curved field or display astigmatism. In common with the second prior art method discussed above, the present invention is able to, and in its preferred embodiment does, avoid astigmatism in the eyepiece.

Theoretically, over-all astigmatism of the sighting device is eliminated when the sagittal and tangential fields of the image-forming system independently match the corresponding fields of the eyepiece. The present invention is the first to provide this feature over a field greater than 25 degrees from the axis.

For certain purposes this independent matching of the sagittal and tangential fields is sufficient, but as the eyepiece is usually working at a wide angular field and the objective system at a much narrower field (the ratio of these fields being numerically equal to the magnifying power of the entire telescope), I have found that when astigmatism is admitted into the eyepiece, the tangential image is likely to move away from the Petzval surface at a rate perhaps 5 or 6 or even more times as rapidly as the sagittal field, whereas in the objective or the erector, because of the narrower field, the ratio of the field movements is closer to 3:1. Thus it happens that the best possible matching of the fields occurs when astigmatism is practically eliminated independently in the image-forming and eyepiece systems. Actually, in the optimum case the eyepiece usually has slightly overcorrected astigmatism matching the under correction of the image-forming system, but this astigmatism is within tolerance limits, commonly described as "free of astigmatism."

This complete independent elimination of astigmatism is possible in a sighting device having, and as a result of, the combination of Petzval sums and curvatures defined above as fundamental to the invention. Furthermore, with such a combination it is also possible to correct all the aberrations which affect the central definition, i. e., to correct chromatic aberration, spherical aberration, spherochromatic and zonal spherical aberration. An objective highly corrected for these aberrations which could be modified to have the required negative Petzval sum and overcorrected field is described in my U. S. Patent 1,880,394. Also, preferred forms of objectives in which these corrections have been made are described in my copending applications Serial Nos. 511,059 and 511,060 filed concurrently herewith. It is pointed out that the inventions described in these copending applications are not limited to objectives for the present invention, i. e., are not limited to objectives with negative Petzval sum and overcorrected curvature of field.

In these concurrent cases the relay lenses are symmetrical and hence corrected for lateral color. Also, while lateral color can be eliminated from a sighting device by balancing this aberration in the image-forming and eyepiece systems, it is better to correct each part separately, especially when a reticle is used in the focal plane of the eyepiece in order to prevent color fringes appearing on the reticle.

And, finally, in this discussion of aberrations it is pointed out that the combination of Petzval sums and curvatures according to the present invention does not interfere with the correction of coma in either the objective system or the eyepiece.

With respect to the eyepiece part of the device, it is noted that, in general, any ordinary type eyepiece in which astigmatism is practically zero is satisfactory for the present invention. However, a preferred type is described in my copending application, Serial No. 511,061, also filed concurrently herewith. Since little or no overcorrection of astigmatism, as found in many prior systems, is required in eyepieces employed with the present invention, the optical effectivity of the cemented surfaces which tend to give such overcorrection must be reduced, yet at the same time the lateral color correction must be maintained at its usual level. To meet this requirement the designer preferably selects two glasses having a low index-difference and a high V-difference. In the copending application referred to, the desired relation between the glasses has been attained by the use of a very high-index crown with an extra dense flint, the high refractive indices having further advantage of permitting the use of weak curves. Various preferred forms of eye-pieces are included in the following description.

There are, of course, practically as many species of the present invention as there are types of sighting devices. The invention is incorporated in the same way in all species except possibly as to the manner in which the negative Petzval sum and the backward curving field are obtained in the image-forming system. When the device consists solely of an objective and an eyepiece, these two factors are, of course, provided by the objective itself. In more complex systems involving relay lenses between the objective and the eyepiece, the required negative Petzval sum and backward field may be provided either by the objective or by one or more of the relay lenses, or partly by each. Since an odd number of relay lenses results in an erect image without any prism erector, it is common practice to refer to a single relay lens as an erector lens.

When a single relay or erector lens is used, I have found that it is preferable to have this erector provide all, or at least the greater part, of the Petzval correction. This is particularly true in symmetrical, unit magnification, sights, such as used in certain forms of periscopes in which the entrance pupil of the objective is in front of it. A reversed eyepiece serves well as such an objective. In this embodiment, therefore, the invention is effectively used twice, since both the objective and the eyepiece have positive Petzval sum, undercorrected field, and practically no astigmatism, and the erector has negative Petzval sum and overcorrected field sufficient to compensate for both the objective and the eyepiece. Of course, fundamentally speaking, such a system is also an example of the single or simple invention when the objective and relay lenses are considered together as the image-forming unit matching the field of the eyepiece.

When two or more relay lenses are included, it is preferable to provide the overcorrected Petzval mainly in the relay lens having the shortest focal length. In fact, it is desirable to make one of the relay lenses of shorter focal length than the others and to use for the other relay stages lenses having relatively flat fields. By way of explanation of this latter preference, the advantages of a short focal length erector are set forth as follows: (1) Since the Petzval sum of any group of lenses scaled up or down to a different focal length is inversely proportional to the focal length, a shorter focal length erector with negative Petzval sum makes a larger negative contribution than the same design in a longer focal length. (2) In any specified length of the whole system, a shorter focal length in the erector requires a longer focal length in the other relay lenses, and these relay lenses will then make a smaller positive contribution to the Petzval sum. On the other hand, their focal length is limited by the diameter of the tube and the aperture ratio being maintained in the system. (3) Since the negative Petzval sum can best be gained by using more components, more expensive kinds of glass, or stronger surfaces, less expense is involved if this assembly is made of shorter focal length and correspondingly smaller diameter. (4) The smaller diameter permits these components to be mounted in careful alignment with one another as a unit in a separate lens barrel which is then placed inside the tube space allotted. And (5), the shorter focal length involves a wider angle of field. I find it easier to match the shape of the field curves of the eyepiece by using larger angular field in the erector, thus reducing the zonal astigmatism of the final image to a very small residual.

To obtain a negative Petzval sum and overcorrected curvature of field with good correction of the other aberrations, including zonal spherical aberration and astigmatism, it is preferable to use as the objective or the erector or whichever lens provides these features, a relatively complex one having at least 8 refracting surfaces, and preferably having 10 or 12 such surfaces. Examples of suitable forms of lenses are mentioned above. Although broad predictions on lens design are never sound, it appears at present that no objective or erector with 7 or fewer refracting surfaces is capable, when used in the present invention, of giving the degree of correction required for most practical purposes.

Of course the invention can be used to obtain wider apparent fields than heretofore without increasing the zonal astigmatism, or it can be used to give complete correction of field flatness or complete correction of astigmatism over field coverage formerly obtained without these corrections. Generally speaking, any balance between these three requirements (wider field, reduced astigmatism, and reduced curvature of field) may be fulfilled to a much higher degree than heretofore.

In the accompanying drawings:

Figs. 1 and 2 show simple sighting devices according to the prior art,

Fig. 3 shows the field curvatures for such a prior device designed to be of good quality, Fig. 4 shows corresponding curves for a similar system according to the invention (specifically that shown in Fig. 8), Fig. 5 shows a symmetrical unit sight according to the invention, Figs. 6 and 7 give data corresponding to Fig. 5, Fig. 8 shows a telescopic sight according to the invention, Figs. 9, 10, and 11 give data corresponding to Fig. 8, Fig. 12 shows a long periscope system according to the invention, Figs. 13 and 14 show two other forms of telescopes according to the invention.

In Fig. 1 the objective 10 forms a curved image 11 which is viewed through the eyepiece 12 by an eye placed at the eye point 13. This system is often used in conjunction with an erecting prism.

In Fig. 2 the objective 20 forms a curved image 21 at or near the field lens 22. The field lens 22 bends the pencil of rays of which one ray is shown so that it passes through the erector assembly 23. The image 21 acts as an object for the erector lens 23 which forms an image 24 of it with added curvature and astigmatism which is then viewed through the eyepiece assembly 25.

It is noteworthy that there are no isolated negative components in Fig. 1 or Fig. 2, and such negative elements as are present are cemented to positive elements which must be of lower index for satisfactory spherical aberration correction. Thus no means is provided for giving the Petzval sum required by the present invention.

In Fig. 3 the solid curves $S_T$ and $S_E$ represent the sagittal or secondary field curves of a typical sighting telescope of the kind shown in Fig. 2. The curves are oriented to correspond to an eyepiece on the right and the rest of the telescope on the left. The sagittal curvature of the image formed by the telescope system up to the eyepiece is shown by $S_T$, whereas the aberrations of the eyepiece are such that the image should follow the curve $S_E$ if it is to appear flat when viewed through the eyepiece. This is the result of the first of the prior art methods described in which average field flatness is attained at the expense of increased astigmatism.

In this case straight radial lines in a flat object would appear to lie on a surface convex toward the observer at the eyepiece, as indicated by the arrow labeled "residual S." The curves $P_T$ and $P_E$ are the corresponding curves for tangential or primary curvatures and indicate a "residual P" in the opposite sense. The result is a fairly flat average curve, but afflicted badly with astigmatism, especially near the edge of the field.

Fig. 4 shows the curves for a corresponding system according to the invention, namely the system shown in Fig. 8. It is to be noted that the sagittal curvature as represented by the distance between curves $S_E$ and $S_T$ is much reduced, while the tangential or primary curvature is completely corrected except for slight zones of positive and negative curvatures. The astigmatisms and curvatures of field are both matched, and the average field is curved concave to the eyepiece in both cases (i. e., backward for the image-forming system). That is, the sagittal and tangential fields match independently.

Fig. 5 shows a unit-power sight in which the objective 50 and the eyepiece 52 are each an eyepiece type of assembly, but with undercorrected field curvatures. The invention is carried out by combining these with an erector assembly 51 which has an overcorrected or negative Petzval sum. In this case the erector assembly consists of four cemented doublets, two negative ones 53 enclosed by two positive ones 54. The Petzval correction is attained partly by using a high index (over 1.71) in the positive components and a medium high index (about 1.61) in the negative components and partly by spacing the components so that a pencil of rays rendered convergent by the first positive component has a considerably smaller diameter when it strikes the negative components. These in turn render it divergent so that it has a large diameter again when it reaches the last positive component.

Figs. 6 and 7 give constructional data for one example of the system shown in Fig. 5. Data are given and repeated below for the objective (Fig. 6) and one half of the erector (Fig. 7). As described above, the system is conveniently symmetrical but not necessarily so.

Objective assembly EF=35.4 mm.  Ptz=+.017

| Lens | N | V | Radii | Thickness |
|---|---|---|---|---|
| I | 1.673 | 32.2 | $R_1=-545.3$ mm. | $t_1=3.90$ mm. |
| II | 1.611 | 57.2 | $R_2=+54.9$ | $t_2=21.40$ |
|  |  |  | $R_3=-40.8$ | $s_1=0.24$ |
| III | 1.620 | 60.3 | $R_4=+115.8$ | $t_3=10.02$ |
|  |  |  | $R_5=-115.8$ | $s_2=0.24$ |
| IV | 1.611 | 57.2 | $R_6=+62.4$ | $t_4=22.80$ |
| V | 1.649 | 33.8 | $R_7=-46.0$ | $t_5=3.28$ |
|  |  |  | $R_8=+64.5$ | $BF=13.70$ |

Half of symmetrical erector assembly

EF=82.0 mm.    Ptz=−.0032

| Lens | N | V | Radii | Thickness |
|---|---|---|---|---|
| I | 1.744 | 45.8 | $R_1=+27.0$ mm. | $t_1=6.0$ mm. |
| II | 1.720 | 29.3 | $R_2=-34.5$ | $t_2=2.0$ |
|  |  |  | $R_3=-96.7$ | $s_1=7.5$ |
| III | 1.617 | 36.6 | $R_4=-24.0$ | $t_3=2.5$ |
| IV | 1.620 | 60.3 | $R_5=+24.0$ | $t_4=3.2$ |
|  |  |  | $R_6=+49.6$ | $\frac{1}{2}s_2=5.1$ |

Fig. 8 shows a sighting telescope in which both the objective 80 and the erector 81 are of the preferred construction including a pair of strongly meniscus components 82 between a pair of positive components 83. Both the objective and the erector have overcorrected Petzval sums obtained as in the previous example except that in this case the negative surfaces are spaced from the positive ones by the thickness of the meniscus components instead of by airspaces. This telescope has a 3× magnifying power.

Figs. 9, 10, and 11 give the constructional details of the objective 80, the erector 81, and the eyepiece 84 respectively of Fig. 8. These tables are repeated here, together with data for field lens 15.

Objective assembly EF=106 mm.    Ptz=−0.011

| Lens | N | V | Radii | Thicknesses |
|---|---|---|---|---|
| I | 1.745 | 46.4 | $R_1=+28.0$ mm. | $t_1=5.74$ mm. |
|  |  |  | $R_2=+50.9$ | $s_1=0.64$ |
| II | 1.611 | 57.2 | $R_3=+23.0$ | $t_2=8.52$ |
| III | 1.617 | 36.6 | $R_4=-39.8$ | $t_3=3.88$ |
|  |  |  | $R_5=+13.3$ | $s_2=16.57$ |
| IV | 1.617 | 36.6 | $R_6=-13.3$ | $t_4=3.88$ |
| V | 1.611 | 57.2 | $R_7=-58.3$ | $t_5=8.52$ |
|  |  |  | $R_8=-23.0$ | $s_3=0.64$ |
| VI | 1.745 | 46.4 | $R_9=-113.0$ | $t_6=5.74$ |
|  |  |  | $R_{10}=-38.4$ | $BF=62.0$ |

Field Lens EF=83 mm.    Ptz=+.008

| Lens | N | V | Radii | Thickness |
|---|---|---|---|---|
| I | 1.523 |  | $R_1=\infty$ | $t_7=7.5$ mm. |
|  |  |  | $R_2=-43.7$ mm. |  |

Erector assembly EF=118 mm.    Ptz=−.002

| Lens | N | V | Radii | Thicknesses |
|---|---|---|---|---|
| I | 1.617 | 55.0 | $R_1=+49.4$ mm. | $t_1=7.07$ mm. |
|  |  |  | $R_2=+343.0$ | $s_1=0.78$ |
| II | 1.617 | 55.0 | $R_3=+42.5$ | $t_2=11.56$ |
| III | 1.605 | 38.0 | $R_4=-134.3$ | $t_3=6.11$ |
|  |  |  | $R_5=+23.3$ | $\frac{1}{2}s_2=10.00$ |
| IV |  |  |  |  |
| V |  |  | Symmetrical with front half |  |
| VI |  |  |  |  |

Eyepiece assembly EF=38 mm.    Ptz=+.013

| Lens | N | V | Radii | Thickness |
|---|---|---|---|---|
| I | 1.720 | 29.3 | $R_1=-59.9$ mm. | $t_1=4.5$ mm. |
| II | 1.697 | 56.1 | $R_2=+40.0$ | $t_2=24.0$ |
|  |  |  | $R_3=-71.2$ | $S_1=0.24$ |
| III | 1.620 | 60.3 | $R_4=+115.8$ | $t_3=10.5$ |
|  |  |  | $R_5=-115.8$ | $S_2=0.24$ |
| IV | 1.697 | 56.1 | $R_6=+80.0$ | $t_4=22.5$ |
| V | 1.720 | 29.3 | $R_7=-36.0$ | $t_5=4.0$ |
|  |  |  | $R_8=-124.8$ |  |

Although an eyepiece like that shown in Fig. 5 can be used in a system of this type, the eyepiece here shown is of the preferred type with crowns of high refractive index such that the crown index plus 0.08 is greater than the index of the flint element cemented thereto. In this example, the indices of all crown elements exceeds 1.6 while both cemented doublets are of the preferred type as regards index difference between the elements.

Fig. 12 is a diagram of a periscope system which is essentially a system similar to that of Fig. 5 lengthened by including two relay lens assemblies 120 and 122 of simple construction and with the distance between conjugates of about 1200 mm. when working at unit magnification; that is, they are of longer focal length than the erector lens 121 in accordance with a preferred feature of the invention. The erector lens 121 is of the preferred type shown and described in Figs. 8 and 10. Thus the relay lenses 120 and 122 are required to cover only a small angular feld and are highly corrected over this field so that they introduce little effect on the field and astigmatism corrections. Field lenses 123, 124 are included in known manner.

A particularly valuable and preferred arrangement is incorporated in the relay lens 120 which consists of two lenses (substantially telescope doublets) widely separated and symmetrically arranged relative to a stop between them. Since the lenses are symmetrically arranged and are working at unit magnification, any coma in either one is cancelled by the coma in the other. However, when coma is present in a lens, the field flatness thereof is adjustable by proper positioning of the stop. Thus in this preferred embodiment, plus coma in considerable amounts is deliberately introduced in each lens and then the lens is positioned at the correct distance from the stop to give a flat field. Obviously, the diameter of the tube in which the relay lens is to be mounted imposes a limit on the diameter of the lens and its distance from the stop. For example tolerance limits for vignetting are sometimes set at no more than 50% even at the edge of the field which in turn dictates the maximum separation of the lenses for any given diameter of tube and angle of field. Lens 120 each half of which works at f/5.0 with a focal length of 319 mm. has the following characteristics.

| Lens | N | V | Radii | Thickness |
|---|---|---|---|---|
| I | 1.517 | 64.5 | $R_1=+414$ mm. | $t_1=11.7$ mm. |
|  |  |  | $R_2=-84$ | $t_2=5.8$ |
| II | 1.617 | 36.6 | $R_3=-200$ | $S=409.5$ |

Lens 122 incorporates this same feature which can be used in any relay system for maintaining flatness of field. It will be noted that the separation of the two components is greater than ¾ of the focal length of either which means that the stop is at a distance from one component greater than ⅜ the focal length of that component. When the separation is less than this amount, the present feature is not so valuable because of the amount of coma necessary to get any effect. Of course the separation of the two components cannot be too great or vignetting for any given angular field would become objectionable even though the light is collimated between the components. Thus to cover any useful field the separation should be less for example than 3 preferably less 2 times the focal length of either components. The actual limit depends on the relative aperture and desired field angle of the lens and also on the vignetting which is arbitrarily acceptable. Fifty per cent vignetting at the edge of a 3° half angle field with f/5.0 components is obtained when the components are separated about twice the focal length of either.

For descriptive purposes here and as used in the accompanying claims, I define vignetting factor V as $1-w_1/w_0$ where $w_1$ is the width of the collimated beam for the extreme angle of field and $w_0$ is the width of the collimated beam for a point on the axis, between the components in both cases. The diameter of each component is D, the separation of the components S and the half angle of field A. With these factors so defined the maximum S equals DV/tan A, but if it is possible to secure the flattened field with a smaller S, the resulting vignetting factor V is smaller, i. e., there is less vignetting.

Usually I find it better to select a separation near the maximum permissible for a given vignetting factor and then introduce the coma necessary to flatten the field. It should be noted that this accomplishes "artificial" flattening rather than Petzval flattening of the field, but because the relatively small angle of coverage of the relay lens the astigmatism is of small magnitude so that articial flattening is satisfactory.

Fig. 13 shows a sighting device consisting entirely of an objective and an eyepiece. The objective 130 is of a type in which the correction of the Petzval sum is accomplished by separating the negative surfaces 134, 135, 136 from the positive surfaces 131, 132, 133 by the thickness of the meniscus lens 138, and separating them from the positive component 137 by the airspace 139. The feature provided by high index positive elements may also be used. The objective 130 forms an image of the object being sighted which is viewed through the eyepiece 140. The eyepiece has astigmatism opposite and substantially equal to that of the objective, and according to the invention the objective 130 has a backward curving field and negative Petzval sum. In general I prefer the form of objective shown in Fig. 8, however, which lends itself better to the overcorrection of Petzval sum.

Fig. 14 shows an optical sighting device in which the optical system consists of an objective 141, a field lens 142, and an erector 143 forming a substantially flat image 144 to be viewed through the eyepiece 145. In this case the negative contribution to the Petzval sum is made by the objective 141. The unique form of field lens 142 whose refractive surfaces have substantially equal curvature has an incidental advantage over a single positive element of the usual form. The ordinary form contributed a positive amount to the Petzval sum and to inward curvature of field, but lens 142 contributes zero to the Petzval sum and a materially reduced amount to inward curvature of field. Hence with such a field lens, the negative Petzval sum and overcorrection of field in the objective 141 need not be as great as they would have to be with an ordinary single lens.

The erector 143 consists of two widely separated lenses having coma and a stop centrally located to insure flatness of field in the same way as lenses 120 and 122 of Fig. 12 operate.

What I claim and desire to secure by Letters Patent of the United States is:

1. An optical sighting lens system covering a field of view of at least 25° from the axis comprising an optical system with its principal planes between its vertices having a negative Petzval sum and overcorrected curvature of field for forming a real image of the object being sighted and an eyepiece for viewing the image consisting of at least four elements composing at least two positive components of which at least one is compound and having a positive Petzval sum and undercorrected curvature of field substantially matching that of the system, said optical system including a positive lens with at least eight refracting surfaces providing said negative Petzval sum and overcorrected field curvature and at least one relay lens consisting of two identical positive components symmetrically arranged on opposite sides of an apertured stop and separated by more than ¾ of the focal length of either component and less than DV/tan A, each component having positive coma sufficient in cooperation with the position of said stop to give a flat field, where D is the diameter of each component, V is the maximum permissible vignetting factor defined as $1-w_1/w_e$ where $w_1$ is the width of the collimated beam for the extreme angle of field and $w_e$ is the width of the collimated beam for a point on the axis, between the components in both cases, and A is the half angle of field to be covered by the relay lens.

2. An optical sighting lens system covering a field of view of at least 25° from the axis comprising an optical system with its principal planes between its vertices having a negative Petzval sum, overcorrected curvature of field and substantially no astigmatism, for forming a real image of the object being sighted and an eyepiece for viewing the image consisting of at least four elements composing at least two positive components of which at least one is compound and having a positive Petzval sum and substantially no astigmatism and having undercorrected curvature of field substantially matching that of said system, said optical system including a positive lens with at least eight refracting surfaces for providing said negative Petzval sum and overcorrected field curvature and at least one relay lens consisting of two identical positive components symmetrically arranged on opposite sides of an apertured stop and separated by more than ¾ of the focal length of either component and less than DV/tan A, each component having positive coma sufficient in cooperation with the position of said stop to give a flat field, where D is the diameter of each component, V is the maximum permissible vignetting factor defined as $1-w_1/w_e$ where $w_1$ is the width of the collimated beam for the extreme angle of field and $w_e$ is the width of the collimated beam for a point on the axis, between the components in both cases, and A is the half angle of field to be covered by the relay lens.

3. An optical sighting lens system comprising an optical system for forming a real image of the object to be sighted and an eyepiece for viewing said image having astigmatism in the form of separated satgittal and tangential fields and consisting of at least four elements composing at least two positive components at least one of the components being compound and including a negative element, characterized in that the said system includes an image-forming lens group having at least eight refracting surfaces and including at least one negative component spaced between positive components, its image conjugates being outside the lens group and its principal points being inside the lens group, such that a pencil of rays from one conjugate point strikes the first positive component, is rendered convergent and has a considerably smaller diameter when it strikes the first negative glass-air surface of the first negative component than its maximum diameter after entering the lens group, and such that the pencil of rays is then rendered divergent and has a larger diameter when it strikes the following positive component than its minimum diameter after striking the first negative component, and further characterized by the corresponding fields of the image-forming system substantially matching respectively those of the eyepiece.

4. An optical sighting lens system according to claim 3 further characterized in that the said image-forming lens group has a negative Petzval sum and the said system has over-corrected curvature of field.

5. An optical sighting lens system comprising an optical system for forming a real image of the object to be sighted and an eyepiece for viewing said image having a positive Petzval sum and undercorrected curvature of field and consisting of at least four elements composing at least two positive components at least one of the components being compound and including a negative element, characterized in that the said system includes an image-forming lens group having at least eight refracting surfaces and including at least one negative component spaced between positive components, its image conjugates being outside the lens group and its principal points being inside the lens group, such that a pencil of rays from one conjugate point strikes the first positive component, is rendered convergent, and has a considerably smaller diameter when it strikes the first negative glass-air surface of the first negative component than its maximum diameter after entering the lens group, and such that the pencil of rays is then rendered divergent and has a larger diameter when it strikes the following positive component than its minimum diameter after striking the first negative component, and further characterized by the image-forming system having a negative Petzval sum and an overcorrected curvature of field substantially matching that of the eyepiece.

6. A sighting lens system according to claim 5 further characterized in that at each curved cemented surface in the eyepiece joining a negative element to a positive element the index diffrence is less than 0.08 and in that the eyepiece and the said system are each substantially corrected for astigmatism.

7. A sighting lens system according to claim 5 in which the said image-forming lens group is a symmetrical relay lens and provides at least the major contribution to said negative Petzval sum and overcorrected field curvature.

8. A sighting lens system according to claim 5 in which the said image-forming lens group is one of a plurality of relay lenses, has a shorter focal length than any other relay lens, and provides at least the major contribution to said negative Petzval sum and overcorrected field curvature.

9. A sighting lens system according to claim 5 which includes an objective similar to the eyepiece and symmetrically arranged thereto with respect to the said image-forming lens group.

10. A sighting lens system according to claim 5 in which the said image-forming lens group is a relay lens and in which the image forming system includes an objective similar to the eyepiece reversed and at least one additional relay lens with a focal length longer than that of the said lens group for at least one additional relaying of the image.

11. A sighting lens system according to claim 5 in which the said lens group consists of two biconcave components spaced between two positive components.

12. A sighting lens system according to claim 5 in which the said lens group consists of two negative meniscus components concave toward each other and spaced between two positive components.

13. A sighting lens system according to claim 5 in which the said optical system includes two lens groups of the kind specified in claim 5.

14. An optical sighting lens system comprising an optical system for forming a real image of the object to be sighted and an eyepiece for viewing said image having a positive Petzval sum and substantially corrected astigmatism and consisting of at least four elements composing at least two positive components at least one of the components being compound and including a negative element, characterized in that the said system includes an image-forming lens group having at least eight refracting surfaces including at least one negative component spaced between positive components, its image conjugates being outside the lens group and its principal points being inside the lens groups, such that a pencil of rays from one conjugate point strikes the first positive component, is rendered convergent, and has a considerably smaller diameter when its strikes the first negative glass-air surface of the first negative component than its maximum diameter after entering the lens group, and such that the pencil of rays is then rendered divergent and has a larger diameter when it strikes the following positive component than its minimum diameter after striking the first negative component, and further characterized by the image-forming system having a negative Petzval sum and substantially corrected astigmatism.

15. A sighting lens system according to claim 14 in which the said lens group consists of two biconcave components spaced between two positive components.

16. A sighting lens system according to claim 14 in which the said lens group consists of two negative meniscus components concave toward each other and spaced between two positive components.

17. A sighting lens system according to claim 14 in which the said optical system includes two lens groups of the kind specified in said claim.

18. For use in an optical system in which an image is relayed at unit magnification to form a secondary image, a relay lens consisting of two identical positive components symmetrically arranged on opposite sides of an apertured stop and separated by more than ¾ of the focal length of either component, and less than DV/tan A, each component having positive coma sufficient in cooperation with the position of said stop to flatten the field of said component, where D is the diameter of each component, V is the maximum permissible vignetting factor defined as $1 - w_1/w_0$ where $w_1$ is the width of the collimated beam for the extreme angle of field and $w_0$ is the width of the collimated beam for a point on the axis, between the components in both cases and A is the half angle of field to be covered by the relay lens.

19. An approximately symmetrical optical sighting lens system comprising an objective and an eyepiece similar but reversed thereto in optical alignment both having astigmatism in the form of separated sagittal and tangential fields both having positive Petzval sums and undercorrected curvature of field and each consisting of at least four elements composing at least two positive components and an erector lens having a negative Petzval sum, overcorrected curvature of field and overcorrected astigmatism for relaying the sagittal and tangential images formed by the objective to match substantially the fields of the eyepiece, said erector lens having at least eight refracting surfaces.

FRED E. ALTMAN.

REFERENCES CITED

The following references are of record in the file of this patent:

UNITED STATES PATENTS

| Number | Name | Date |
|---|---|---|
| 1,468,762 | Taylor et al. | Sept. 25, 1923 |
| 540,122 | Taylor | May 28, 1895 |
| 1,478,704 | Erfle | Dec. 25, 1923 |
| 1,395,822 | Hastings | Nov. 1, 1921 |
| 1,317,749 | Aldis | Oct. 7, 1919 |
| 1,097,635 | Humbrecht | May 26, 1914 |
| 1,584,272 | Bertele | May 11, 1926 |
| 1,863,099 | Bowen | June 14, 1932 |
| 1,955,590 | Lee | Apr. 17, 1934 |
| 2,146,905 | McLeod et al. | Feb. 14, 1939 |
| 936,541 | Kellner | Oct. 12, 1909 |
| 984,929 | Kellner | Feb. 21, 1911 |
| 1,290,777 | O'Brien | Jan. 7, 1919 |
| 2,276,284 | Burka et al. | Mar. 17, 1942 |
| 1,445,284 | Bell et al. | Feb. 13, 1923 |
| 940,894 | Von Rohr | Nov. 23, 1909 |
| 1,143,667 | Von Rohr | June 22, 1915 |

FOREIGN PATENTS

| Number | Country | Date |
|---|---|---|
| 409,465 | Great Britain | May 3, 1934 |
| 499,992 | Germany | June 25, 1930 |